United States Patent [19]
Bean et al.

[11] Patent Number: 5,115,193
[45] Date of Patent: May 19, 1992

[54] INDUCTIVE LINEAR DISPLACEMENT TRANSDUCER AND TEMPERATURE-COMPENSATING SIGNAL PROCESSOR

[75] Inventors: Orville E. Bean, Wayland; Daniel R. Weber, Groton, both of Mass.

[73] Assignee: Data Instruments, Inc., Acton, Mass.

[21] Appl. No.: 622,436

[22] Filed: Dec. 5, 1990

[51] Int. Cl.⁵ .................. G01B 7/14; H01F 15/16; H01F 21/06
[52] U.S. Cl. .................. 324/207.12; 324/207.16; 324/207.24; 336/45; 336/179
[58] Field of Search .......... 324/207.12, 207.13, 324/207.16, 207.18, 207.19, 207.24, 225; 336/30, 45, 179; 340/870.31, 870.32, 870.33, 870.35, 870.36

[56] References Cited
U.S. PATENT DOCUMENTS

| | | | |
|---|---|---|---|
| 3,707,671 | 12/1972 | Morrow et al. | 336/179 X |
| 4,667,158 | 5/1987 | Redlich | 324/207.19 |
| 4,797,614 | 1/1989 | Nelson | 331/65 X |
| 4,864,232 | 9/1989 | Redlich | 324/225 X |
| 4,866,378 | 9/1989 | Redlich | 324/225 X |
| 4,912,409 | 3/1990 | Redlich et al. | 324/207.13 |
| 4,954,776 | 9/1990 | Husher | 324/207.16 |

Primary Examiner—Gerard R. Strecker
Attorney, Agent, or Firm—Pandiscio & Pandiscio

[57] ABSTRACT

A transducer system is provided including an inductive linear displacement transducer connected to a temperature-compensating signal processor. The signal processor includes (a) an amplitude-variable, frequency-stable device providing a modulated D.C. current through the transducer, (b) a temperature-sensitive element connected in series between the transducer and the current-providing device such that it is subjected to substantially the same temperature as the transducer, and (c) a signal processing circuit coupled to the temperature-sensitive element. The temperature-sensitive element has a high temperature coefficient so that temperature changes have a substantial effect on the DC offset of the signal coming from the temperature-sensitive element, and a low dynamic resistance so that temperature changes have substantially no effect on the amplitude of the signal coming from the temperature-sensitive element. The signal processing circuit (1) detects changes in the DC offset of the signal coming from the temperature-sensitive element and generates a signal used as the input to the current-providing device to adjust the amplitude of the modulation of the current in compensation for changes in the amplitude of the signal coming from the transducer due to temperature changes; and (2) monitors the amplitude component of the signal coming from the temperature-sensitive element and provides an output signal reflective of the linear displacement of an object connected to the transducer.

20 Claims, 2 Drawing Sheets

INDUCTIVE LINEAR DISPLACEMENT TRANSDUCER AND TEMPERATURE-COMPENSATING SIGNAL PROCESSOR

FIELD OF THE INVENTION

This invention relates to linear displacement transducers in general, and more particularly to inductive linear displacement transducers and signal processors adapted for use with the same.

BACKGROUND OF THE INVENTION

Inductive linear displacement transducers and signal processors adapted for use with the same are well known in the art. See, for example, U.S. Pat. No. 4,667,158, issued May, 19, 1987 to Robert W. Redlich for "Linear Position Transducer And Signal Processor", which discloses an inductive linear displacement transducer and an associated signal processor adapted to measure the straight line motion of an object.

In general, the transducer disclosed in U.S. Pat. No. 4,667,158 comprises a hollow tube-like support bobbin formed out of an electrically insulating material (e.g. plastic); a helical coil wound around the outer surface of the bobbin, the helical coil being formed out of a good electrical conductor (e.g. copper); a cylindrical core axially movable within the bobbin, the cylindrical core being formed out of a good electrical conductor having low magnetic permeability (e.g. copper or aluminum); an attachment rod connecting the core with the object whose motion is to be measured; a shield tube surrounding the remainder of the transducer and confining magnetic flux generated by current flowing through the coil to the interior of the transducer and shielding the coil from stray fields, the shield tube being formed out of a material having both high electrical conductivity and high magnetic permeability (e.g. soft iron or low carbon steel); and a tubular layer disposed between the coil and the shield tube and having the effect of reducing the reluctance of this space to a low value, the tubular layer being formed out of a material having high magnetic permeability and low electrical conductivity (e.g. a ferrite powder distributed within a suitable hardened bonding agent).

Still other details relating to the construction of the inductive linear displacement transducer disclosed in U.S. Pat. No. 4,667,158 are provided in that patent, the contents of which are incorporated herein by reference.

When the attachment rod of the transducer is connected to an object whose displacement is to be measured, and the coil is suitably energized, changes in the position of the object will result in changes in the position of the core relative to the coil; this movement of the core relative to the coil will, in turn, cause changes in the inductance of the coil by means of skin effect, which changes in inductance can be measured to provide an indication of the linear displacement of the object.

U.S. Pat. No. 4,667,158 also discloses signal processor means for measuring such changes in inductance so as to indicate the linear motion of the object. Such signal processor means make use of a bridge circuit adapted to provide an output voltage which is proportional to the distance moved by the core (and hence proportional to the distance moved by the object connected to the core). More specifically, a source of AC voltage in the range of 50-200 kHz excites the bridge circuit, one branch of which is the transducer coil. Half-wave rectifiers are used to convert the AC output signal from the bridge circuit to a DC voltage which is proportional to, or otherwise varies as a function of, the distance moved by the core.

Still other details relating to the construction of the signal processor means disclosed in U.S. Pat. No. 4,667,158 are provided in that patent, the contents of which have been incorporated herein by reference.

Unfortunately, it has been found that the linear displacement transducer and signal processor means disclosed in U.S. Pat. No. 4,667,158 are affected by temperature, to the extent that changes in the transducer's temperature can cause changes in its output signal which are not related solely to changes in its core position. Stated another way, it has been found that changes in transducer temperature can cause the transducer's output signal to vary, so that it is no longer just proportional to the distance moved by the core.

More specifically, the curve $C_1$ in FIG. 1 schematically illustrates the output signal of a typical inductive linear displacement transducer of the type described above, when the transducer is at some temperature $T_1$ and its core is set in its "out" (i.e., extended) position. The curve $C_2$ in FIG. 1 schematically illustrates the output signal of the same transducer when the transducer is at the same temperature $T_1$ but its core is set in its "in" (i.e., retracted) position. As can be seen by comparing the curves $C_1$ and $C_2$ in FIG. 1, a change in the transducer's core position while holding its temperature constant has the effect of changing the amplitude component of the signal coming from the transducer, but it has essentially no effect on the frequency or the DC offset component of that signal. As a result, so long as the temperature of the transducer remains stable, the AC output signal coming from the transducer can be read using half-wave rectifiers so as to provide a corresponding DC voltage which is representative of the transducer's core position at any point along the limits of its stroke.

As noted above, curve $C_1$ in FIG. 1 schematically illustrates the output signal of a typical inductive linear displacement transducer when that transducer is at some temperature $T_1$ and its core is set in its "out" position. The curve $C_1$ from FIG. 1 has been duplicated in FIG. 2. The curve $C_3$ in FIG. 2 schematically illustrates the output signal of the same transducer when the transducer is at a different, higher temperature $T_2$ and its core is set in its "out" position. (It is to be appreciated that the curves $C_1$ and $C_3$ have been exaggerated to some extent in FIG. 2 to better illustrate the effect being observed). As can be seen by comparing the curves $C_1$ and $C_3$ in FIG. 2, a change in the transducer's temperature while holding its core position constant has the effect of changing the amplitude component of the tranducer's output signal.

(It is also to be appreciated that a change in the transducer's temperature can also cause a change in the DC offset component of the transducer's output signal. However, such a change in the DC offset component does not create a problem with linear displacement transducers and signal processor means of the sort disclosed in U.S. Pat. No. 4,667,158, since any such change in the DC offset can be easily removed from the transducer's output signal by filtering and hence does not negatively affect the accuracy of the system. In this regard, it is also to be appreciated that any such changes occurring in the DC offset component due to temperature effects on the transducer have been omitted from FIG. 2 for purposes of clarity so as to help emphasize the change taking place in the AC component of the transducer's output signal, which is the effect of interest.)

In view of the fact that (a) variations in core position cause changes in the amplitude of the AC component of the transducer's output signal, and (b) variations in transducer temperature cause changes in the amplitude of the AC component of the transducer's output signal, it will be seen that signal processor means of the sort adapted to look principally at changes in the amplitude component of the transducer's output signal to identify changes in the transducer's core position will be inaccurate when changes occur in the temperature of the transducer. Stated another way, inasmuch as both variations in core position and variations in transducer temperature can cause changes in the amplitude of the transducer's output signal, signal processor means adapted to look generally at changes in the amplitude component of the transducer's output signal will have no way of determining whether a detected change in amplitude is occurring due to a change in core position or a change in transducer temperature. Hence, use of an inductive linear displacement transducer with such signal processor means in a temperature-varying environment may render the system inaccurate as a reliable measure of changes in core position.

In some circumstances the aforementioned temperature effects on the inductive linear displacement transducer and its associated signal processor means may be relatively insignificant and may be safely ignored. This will be better appreciated when it is recalled that the curves $C_1$ and $C_3$ in FIG. 2 are exaggerated relative to one another for better illustration of the effects being discussed; in fact, in a typical inductive linear displacement transducer application, the amplitude component of the transducer's output signal varies only about 0.5–1.0% over a range of approximately 100° F. However, for some applications these temperature effects can be significant and can render the system sufficiently inaccurate as to be unreliable for its intended purpose.

In view of the foregoing, efforts have been made to compensate for such temperature effects on the inductive linear displacement transducer and its signal processor means.

In one arrangement, the known temperature coefficient of resistance ("TC") of the transducer's coil is used to detect and compensate for changes in temperature. More particularly, the change in the DC offset of the transducer's output signal is correlated to changes in the temperature of the transducer; this information is then used to correct the transducer's output signal for changes in temperature. Unfortunately, however, this approach tends to be relatively crude, for several reasons. For one thing, the DC temperature sensitivity of the coil tends to be fairly low. More specifically, the linear displacement transducer typically operates at about 25 mA and has a DC resistance of about 2 ohms, so that the transducer's winding has a DC voltage drop of about 50 mV. At a temperature sensitivity of approximately +3900 ppm/°C., this translates into a transducer temperature coefficient ("TC") of only about +195 uV/°C. at the transducer's operating levels. In addition, since this technique requires that the DC resistance of the transducer's connecting cable be read along with (i.e., in additive relation to) the DC resistance of the transducer winding, and since the DC resistance of the transducer's connecting cable is fairly close to the DC resistance of the transducer winding (typically about 2 ohms for the transducer's winding and about 1 ohm for the normal 10 foot connecting cable), it will be seen that changes in the DC offset may not necessarily reflect just the temperature changes taking place at the transducer; they may also reflect temperature changes taking place in the connecting cable. This can be a serious consideration, especially when one takes into account the fact that the transducer's connecting cable is typically about 10 feet long, and hence is quite likely to be at a different temperature (or temperatures) than the transducer's coil. On account of the foregoing, it will be seen that attempts to use the DC temperature sensitivity of the transducer's coil to correct for changes in transducer temperature tend to yield relatively poor results.

In another arrangement, the known temperature coefficient ("TC") of a conventional silicon diode is used to detect and compensate for changes in transducer temperature. More particularly, the transducer's coil is connected between a source of AC voltage and a common line, and a conventional silicon diode is connected between the common line and a third terminal, and a temperature-compensating signal is then read from the third terminal. Since a conventional silicon diode typically has a temperature coefficient ("TC") of about −2.07 mV/°C. at the transducer's operating levels, the silicon diode is approximately 10 times more sensitive than the transducer's winding in detecting changes in temperature. Unfortunately, however, this technique requires the provision of a third wire, and in many circumstances there is a need to hold the number of wires down to two.

OBJECTS OF THE INVENTION

Accordingly, the principal object of the present invention is to provide an inductive linear displacement transducer and an associated temperature-compensating signal processor which will provide accurate measurements of linear motion regardless of changes in transducer temperature.

Another object of the present invention is to provide an inductive linear displacement transducer and an associated temperature-compensating signal processor which uses just two wires coming off the transducer assembly to provide a temperature-compensated output signal.

Still another object of the present invention is to provide an inductive linear displacement transducer and an associated temperature-compensating signal processor, wherein the transducer and signal processor are low in cost and reliable in operation.

Another object of the present invention is to provide a temperature-compensating signal processor which is capable of being used with a variety of two-wire inductive linear displacement transducers.

A further object of the present invention is to provide a system for measuring the linear displacement of an object, wherein the system comprises an inductive linear displacement transducer and means coupled to the transducer for providing a signal representative of linear displacement that is compensated for changes in transducer temperature.

SUMMARY OF THE INVENTION

These and other objects are addressed by the present invention, which comprises an inductive linear displacement transducer of the type hereinabove described, and a temperature-compensating signal processor connected to the inductive linear displacement transducer. The temperature-compensating signal processor comprises: (a) terminal means for connection to a source of DC potential; (b) current regulator means connecting the terminal means to the transducer so as to provide a current through the transducer; (c) amplitude-variable, frequency-stable driver means connected to the current regulator means for modulating the current provided by the current regulator means in response to an input signal applied to the driver means; (d) temperature-responsive means connected in series between the current regulator means and the transducer so that the temperature-responsive means are subjected to substantially the same temperature as the transducer, and (e) signal processing means coupled to the temperature-responsive means for providing a temperature-corrected output signal representative of any change in transducer displacement. The temperature-responsive means is capable of causing a relatively large change in the DC offset of the signal coming from the transducer through the temperature-responsive means in response to a change in the temperature to which the transducer and the temperature-responsive means are subjected, but will not cause a change in the amplitude component of the AC signal coming from the transducer through the temperature-responsive means when the transducer and the temperature-responsive means are subjected to a change in temperature, whereby any change in the DC offset of the signal coming from the transducer will be principally from the effect of a change in temperature of the temperature-responsive means. In a preferred embodiment of the invention, the signal processing means comprises (1) first means connected between the current regulator means and the temperature-responsive means for detecting changes in the DC offset of the signal coming from the transducer and generating a corresponding signal as the input signal to the driver means, whereby the driver means will adjust the modulation of the current provided by the current regulator means so as to compensate for any change in the amplitude of the signal coming from the transducer due to changes in transducer temperature; and (2) second means for monitoring the amplitude component of the signal coming from the transducer and providing an output signal which is reflective of the core position of the transducer.

Preferably the temperature-responsive means comprises a diode having a relatively high temperature coefficient ("TC") so that changes in temperature have a relatively substantial effect on the DC offset of the signal coming from the transducer and diode combination, a relatively low dynamic resistance so that changes in temperature have substantially no effect on the amplitude of the signal coming from the transducer through the diode, and a relatively low voltage drop across the diode so that there is relatively little self-heating of the diode during use. Preferably the invention utilizes a Shottky diode. By keeping the current through the Shottky diode constant, the voltage/temperature characteristic of the diode is fixed and unchanging.

BRIEF DESCRIPTION OF THE DRAWINGS

Still other objects and features of the present invention will be disclosed or rendered obvious by the following detailed description of the invention, which is to be considered together with the accompanying drawings wherein.

DETAILED DESCRIPTION OF THE PREFERRED EMBODIMENT OF THE INVENTION

Figure 3:
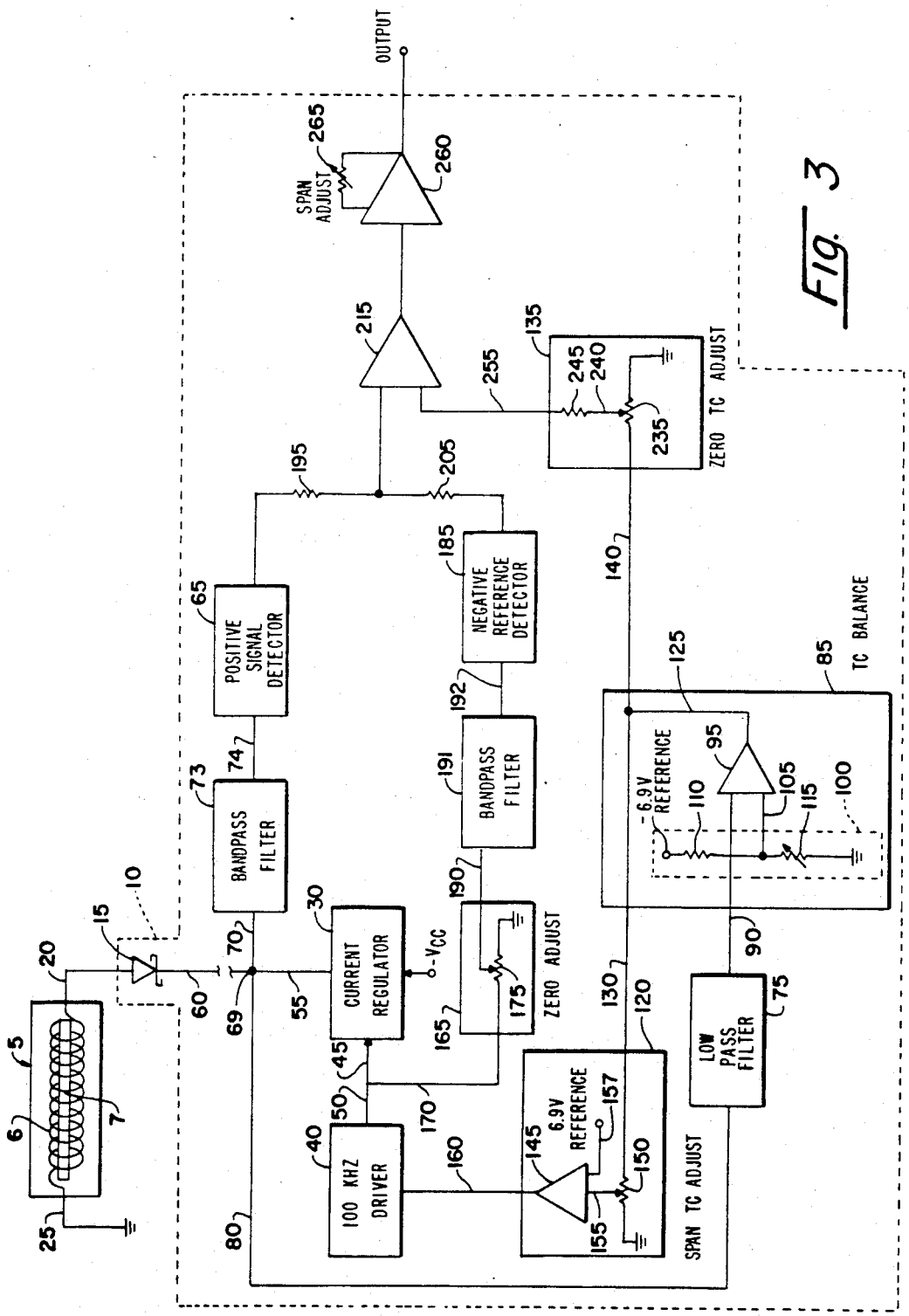
FIG. 3 is a schematic view showing the linear displacement transducer and a preferred form of temperature-compensating means embodying the present invention.

Looking next at FIG. 3, there is shown an inductive linear displacement transducer 5 and its associated temperature-compensating signal processor 10 which comprise the preferred embodiment of the present invention.

Transducer 5 is an inductive linear displacement transducer adapted to measure the straight line motion of an object. By way of example, transducer 5 could be the same as or similar to the transducer disclosed in U.S. Pat. No. 4,667,158, although it could also be an equivalent inductive linear displacement transducer of the sort well known in the art. Transducer 5 comprises a coil 6 and a core 7. One end of coil 6 is connected to the anode of a diode 15 of temperature-compensating signal processor 10 via a line 20; the other end of coil 6 is connected to ground via a line 25. The cathode of diode 15 is connected to a source of DC potential, as will hereinafter be described. It is to be appreciated that diode 15 is positioned immediately adjacent to, and preferably encapsulated with, transducer 5 so that line 20 has a relatively short length, e.g. one inch or less. In this way it will be assured that diode 15 and transducer 5 will be at the same temperature. One end of core 7 is connected to the movable object (not shown) whose motion is to be measured. As noted previously, the signal coming from the transducer varies in accordance with the position of its movable core 7 (i.e., moving core 7 relative to the coil 6 causes a change in the effective inductance of the transducer and hence a change in the amplitude component of the AC signal coming from the transducer), and the signal coming from the transducer varies in accordance with transducer temperature (i.e., a change in transducer temperature causes a change in the amplitude of the AC component of the signal coming from the transducer). Of course, since diode 15 is placed in series with the transducer, between the source of DC potential and the transducer, it is to be appreciated that the signal coming from the diode also includes any effects of temperature on the diode, as will hereinafter be discussed in further detail. It is also to be appreciated that preferably, but not necessarily, transducer 5 typically operates at about 25 mA and its coil 6 has a resistance of about 2 ohms. Coil 6 also typically has a temperature coefficient ("TC") of about −195 uV/°C. at the transducer's operating levels.

The temperature-compensating signal processor 10 comprises a current regulator 30 that connects diode 15 via lines 55 and 60 to a source of DC potential, i.e., a DC voltage source −$V_{cc}$, and serves to provide a constant DC current through the coil. Preferably the DC supply voltage −$V_{cc}$ is set at about −15 volts DC and the DC current in the coil is fixed at about 25 mA. Current regulator 30 has an input control terminal that is connected to the output of a driver 40 via a line 45 and a line 50. Driver 40 is a conventional oscillator of the type adapted to produce a constant frequency output signal having an amplitude that varies in accordance with an input control signal. Driver 40 serves to modulate the output of current regulator 30 at a frequency of 100 kHz. The output terminal of current regulator 30 is also connected to the input terminal of a positive signal detector 65 via line 55, a line 70, a 100 kHz bandpass filter 73 and a line 74, and to a low pass filter 75 via line 55 and a line 80. Bandpass filter 73 passes AC signals in the frequency of interest, but rejects DC signals.

It is to be appreciated that line 60 generally represents the transducer's connecting cable; in the case where the normal 10 foot connecting cable is used, this cable typically has a DC resistance of about 1 ohm, or approximately one half that of the transducer's coil 6. It is also to be appreciated that, because the diode 15 is mounted in close proximity with the coil, the line 20 connecting diode 15 with transducer coil 6 has an insignificant length (e.g. one inch or less) and hence presents an insignificant resistance relative to that of coil 6 and cable 60.

Diode 15 is placed in series between transducer 5 and current regulator 30 and serves as a temperature-responsive means characterized by (1) a relatively high temperature coefficient ("TC") so that changes in diode temperature have a relatively substantial effect on the DC offset of the signal coming from the transducer, and (2) a relatively low dynamic resistance so that changes in diode temperature have substantially no effect on the amplitude component of the AC signal coming from the transducer. As noted previously, diode 15 is placed adjacent to, and is preferably encapsulated with, transducer 5 so that diode 15 is subjected to the same temperatures as transducer 5.

Diode 15 is preferably a Shottky diode such as a 1 amp 1N5818 device having a dynamic resistance of about 1 ohm at the operating current of about 25 mA, and a temperature coefficient ("TC") of about −1.6 mV/°C. In this respect, it is to be appreciated that inasmuch as transducer 5 has a temperature coefficient of about +195 uV/°C. as noted above, diode 15 has a temperature coefficient which is approximately 8 times that of the transducer's coil 6, and about 16 times that of the typical 10 foot connecting cable 60. Thus, diode 15 has a temperature sensitivity which is significantly greater than that of coil 6 or cable 60.

The signal at node or junction 69 is fed via line 80 to a low pass filter 75. Filter 75 passes DC signals but rejects AC signals of the frequency of interest. Hence filter 75 provides a corresponding DC output signal that is applied to a TC balance unit 85 via a line 90. The DC signal passed by low pass filter 75 to TC balance unit 85 via line 90 is the DC offset component of the signal appearing at junction 69. In this regard, it is to be appreciated that since the DC offset component of the signal coming from transducer 5 is a function of the DC supply voltage −$V_{cc}$ and the temperature effects on cable 60, diode 15 and coil 6, and since Shottky diode 15 has a temperature coefficient which is approximately 8 times that of transducer 5 and approximately 16 times that of connecting cable 60, the major portion of any change occurring in the DC offset component of the signal at junction 69 due to temperature effects will be the change caused by the temperature effects on the highly temperature-sensitive Shottky diode 15. Since diode 15 is located at the transducer itself, any change occurring in the DC offset component of the signal at junction 69 will tend to be a highly reliable indicator of any change in the temperature of transducer 5.

TC balance unit 85 is adapted to respond to the DC signal output of low pass filter 75. TC balance unit 85 comprises an operational amplifier 95 which has one input terminal connected to the output line of low pass filter 75 via line 90, while its other input terminal is connected to a voltage divider 100 via a line 105. By way of example but not limitation, voltage divider 100 comprises a fixed resistor 110 and a variable resistor 115 connected between a −6.9 volt source and ground, and the junction of resistors 110 and 115 is connected to one of the amplifier's input terminals. The voltage input to this input terminal of amplifier 95 can be adjusted by varying the setting of variable resistor 115. The output of amplifier 95 is applied to a span TC adjust unit 120 via an output line 125 and a line 130, and to a zero TC adjust unit 135 via line 125 and a line 140.

Span TC adjust unit 120 comprises an amplifier 145 and a potentiometer 150, with the resistance element of the potentiometer being connected between the output terminal of amplifier 95 and ground. The tap of potentiometer 150 is connected to one input terminal of amplifier 145 via a line 155, whereby the DC voltage input to amplifier 145 supplied on line 155 can be adjusted. The other input terminal of amplifier 145 is connected to a suitable voltage source, e.g. a positive 6.9 volt source, via a line 157. The output of amplifier 145 is connected to the input control terminal of driver 40 via a line 160.

As noted above, driver 40 is a conventional amplitude-variable, frequency-stable oscillator. The amplitude of the driver's output signal on line 50 varies in accordance with the DC output signal on line 160 of span TC adjust unit 120.

Figure 1:
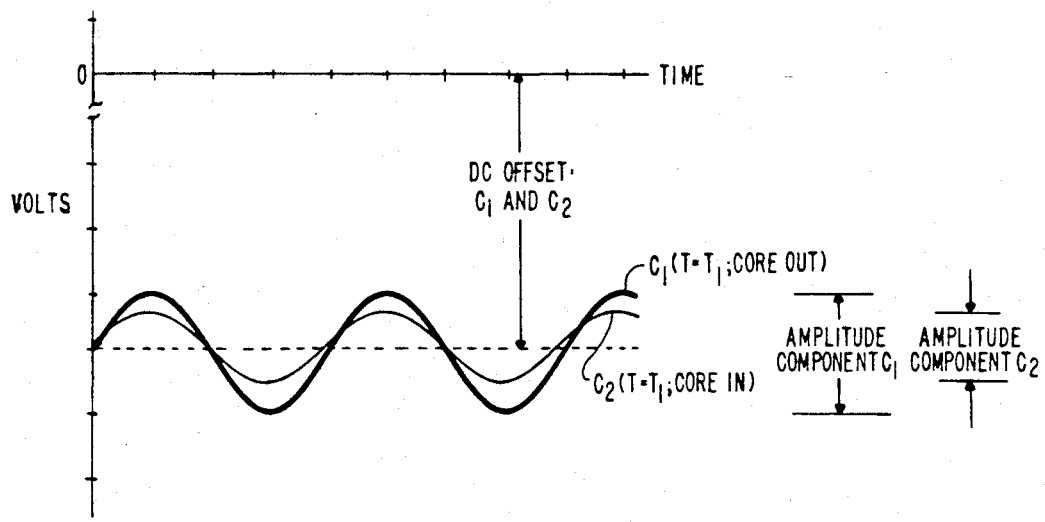
FIG. 1 shows the signal characteristics of a typical inductive linear displacement transducer at some temperature $T_1$, wherein the curve $C_1$ schematically illustrates the output signal of the transducer when its core is set in its "out" position, and the curve $C_2$ schematically illustrates the output signal of the transducer at the same temperature when its core is set in its "in" position.
Figure 2:
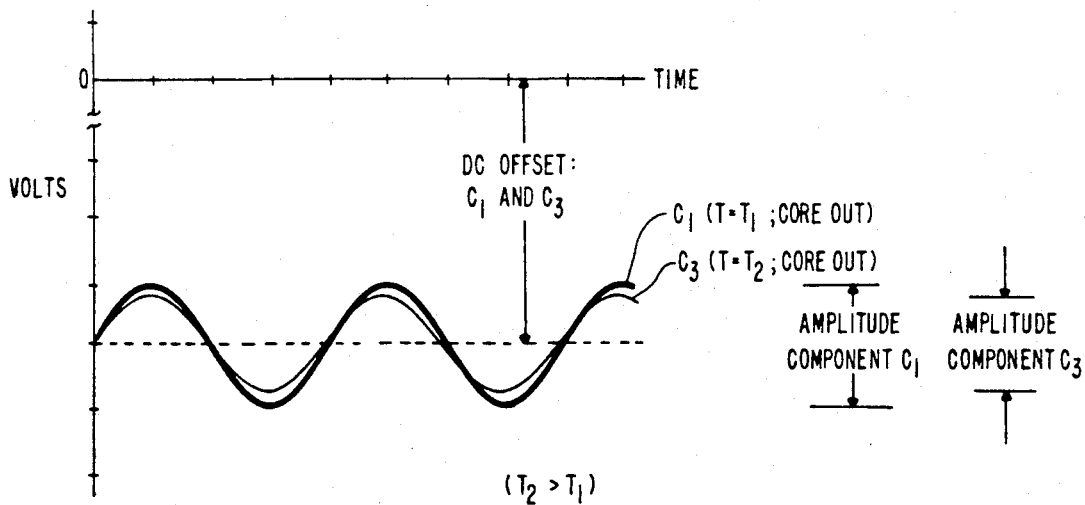
FIG. 2 shows the signal characteristics of the same transducer, wherein the curve $C_1$ schematically illustrates the output signal of the transducer when the transducer is at some temperature $T_1$ and its core is in its "out" position, and the curve $C_3$ schematically illustrates the output signal of the transducer when the transducer is at some higher temperature $T_2$ and its core is still in its "out" position (any changes occurring in the DC offset due to temperature effects on the transducer have been omitted from FIG. 2, for purposes of clarity and also so as to emphasize the change in the amplitude of the AC component of the transducer's signal due to temperature, the latter change being the effect of interest in relation to this invention)

Since the DC input signal supplied to driver 40 by span TC adjust unit 120 is itself derived from the DC offset component of the signal appearing at junction 69 via low pass filter 75 and TC balance unit 85, and inasmuch as that DC offset component is a function of the DC supply voltage −$V_{cc}$ and the temperature effects on cable 60, diode 15 and coil 6, and inasmuch as the major portion of any change occurring in that DC offset component due to a change in temperature is the change caused by temperature on the highly temperature-sensitive Shottky diode 15 which is located at the transducer itself, it will be seen that the amplitude of the driver's output signal will be adjusted in accordance with changes in transducer temperature; and that, as a result, signal processor 10 can compensate for any change in the amplitude component in the signal coming from the transducer due to changes in transducer temperature, by using the change in the DC offset component caused principally by diode 15, which is located at the transducer and hence accurately reflects changes in transducer temperature. More particularly, as a change in the transducer's temperature causes the AC amplitude component of the signal coming from the transducer to change (see FIG. 2), that change in temperature will also cause the highly temperature-sensitive Shottky diode to impart a relatively large change in the DC offset component of the signal coming from the transducer through the diode. Low pass filter 75, TC balance unit 85, span TC adjust unit 120 and driver 40 will cooperate with one another to read the change in the DC offset component at node 69 as an indicator of temperature change in the transducer, and then correspondingly change the amplitude of the driver's output signal so as to keep the amplitude component of the AC signal at junction 69 steady and thereby offset any change occurring in the amplitude component of the signal coming from the transducer due to a change in transducer temperature.

The output terminal of driver 40 is also connected to the input of zero adjust unit 165 via lines 50 and 170. Zero adjust unit 165 comprises a potentiometer 175, with one end of its resistor element being connected to line 170 and its other end being connected to ground. The tap of potentiometer 175 is connected to the input of a 100 kHz bandpass filter 191 via a line 190, which is in turn connected to a negative reference detector 185 via a line 192, whereby the voltage input supplied to negative reference detector 185 can be adjusted by varying the setting of potentiometer 175.

Bandpass filter 73 permits only the AC component of the signal at junction 69 to pass through to positive signal detector 65, while rejecting any DC component in the signal at 69. Positive signal detector 65 comprises a half-wave rectifier which converts the output of bandpass filter 73 into a corresponding DC signal. Bandpass filter 191 permits only the AC component of the signal coming from driver 40 to pass through to negative reference detector 185. Detector 185 is a half-wave rectifier and serves to convert the output of bandpass filter 191 into a corresponding DC signal. Resistors 195 and 205 are of equal value and are connected to each other and also to the output terminals of detectors 65 and 185. The junction of resistors 195 and 205 is connected to one input terminal of a summing amplifier 215. Thus it will be seen that the DC outputs of positive signal detector 65 and negative reference detector 185 are summed before they are applied to summing amplifier 215. Accordingly, the signal applied to the negative input terminal of summing amplifier 215 will be zero if the signals from positive signal detector 65 and negative reference detector 185 are the same.

The zero TC adjust unit 135 comprises a potentiometer 235 whose resistor element is connected between the output of amplifier 95 and ground. The tap 240 of potentiometer 235 is connected to one end of a fixed dropping resistor 245. The other end of resistor 245 is connected to the other input terminal of summing amplifier 215 via a line 255.

The output of summing amplifier 215 is connected to the input of a DC amplifier/filter unit 260. DC amplifier/filter unit 260 includes a variable resistance feedback network 265 that acts as a span adjust unit and controls the gain of the DC amplifier/filter unit 260. The output of DC amplifier/filter unit 260 is a DC voltage which is proportional to the position of core 7 in coil 6 and compensates for any temperature effects on transducer 5.

Of course, the transducer 5 and temperature-compensating signal processor 10 must be initially calibrated before use. Calibration is achieved through adjustment of potentiometer 175 in zero adjust unit 165, potentiometer 150 in span tc adjust unit 120, potentiometer 235 in zero tc adjust unit 135, and span adjust 265 in DC amplifier/filter 260, in ways obvious to persons skilled in the art.

After the apparatus has been calibrated, it may then be used in ways well known in the art to provide an electrical signal which is representative of a measurement of straight line motion. Because the apparatus includes a temperature-compensating signal processor, the device can be used in a variety of different thermal environments with highly reliable results. By way of example, in practice it has been found that an inductive linear displacement transducer 5 equipped with a temperature-compensating signal processor 10 can yield results which are 4-5 times more accurate than the apparatus disclosed in U.S. Pat. No. 4,667,158, when the transducer is subjected to the full temperature range of the transducer.

As indicated above, diode 15 is preferably a Shottky diode such as a 1 amp 1N5818 device having a dynamic resistance of about 1 ohm at the operating current of about 25 mA, and a temperature coefficient ("TC") of about $-1.6$ mV/°C., which is approximately 8 times that of the transducer's coil and 16 times that of the typical connecting cable 60.

Alternatively, diode 15 could be a conventional silicon diode of the sort having a dynamic resistance of about 2.8 ohms at the operating current of about 30 mA. Such a silicon diode has a temperature coefficient ("TC") of about $-2.07$ mV/°C., which is approximately 10 times that of the transducer's coil and 20 times that of the typical connecting cable 60. Or diode 15 could be a larger 1 amp diode such as a 1N4005 device having a dynamic resistance of about 1.7 ohms at the operating current of about 25 mA. However, the higher dynamic resistances of such diodes creates a number of problems. Some of these problems (e.g. linearity) can be overcome by the use of a 10 uF bypass capacitor; others (e.g. self-heating) cannot. Thus, the relatively low dynamic resistance, relatively low voltage drop and relatively high temperature coefficient ("TC") of the Shottky diode make it most desirable for use in the present invention. However, the present invention may make use of other types of diodes as well.

It is also anticipated that other changes could be made to the temperature-compensating signal processor 10 without departing from the scope of the present invention. More specifically, in the signal processor 10 described above and illustrated in FIG. 3, the desired temperature compensation is effected by (1) first reading the change in the DC offset of the signal coming from the diode as an indicator of temperature change taking place at the transducer, and (2) then using this change in the DC offset to generate a control signal which is used to adjust the modulation provided by driver 40 so as to compensate for any changes taking place in the AC component of the transducer's output signal due to temperature effects on the transducer. However, it is also anticipated that one could use the change in the DC offset of the signal coming from the diode to effect temperature compensation without adjusting the modulation provided by driver 40.

For example, one could use the change in the DC offset of the signal coming from the diode to generate a correction signal which is then summed with the output of the circuit elements analyzing the AC component of the signal coming from the diode, such that the summed output signal is temperature corrected.

Or, one could use the change in the DC offset of the signal coming from the diode to generate a signal representative of the temperature change taking place at the transducer, and then apply that signal to a microprocessor in conjunction with a temperature-compensating look-up table, to provide a temperature-corrected output signal indicative of a change in transducer position.

Finally, as noted above, this invention may be used in conjunction with numerous types of inductive linear displacement transducers, including but not limited to the transducer disclosed in U.S. Pat. No. 4,667,158 discussed above, and the transducer disclosed in U.S. Pat. No. 4,912,409, issued Mar. 27, 1990 to Redlich et al. for "Actuator Displacement Transducer Having External Flux Excluding Tube".

Advantages Of The Invention

Numerous advantages are achieved by using the present invention.

For one thing, the present invention provides an inductive linear displacement transducer and an associated temperature-compensating signal processor which will provide accurate measurements of linear motion regardless of changes in transducer temperature.

For another thing, the present invention provides an inductive linear displacement transducer and an associated temperature-compensating signal processor which requires the use just two wires coming off the transducer, whereas similar prior art devices have required 3 wires to achieve accurate temperature compensation.

And further, the present invention provides an inductive linear displacement transducer and associated temperature-compensating signal processor which combines improved performance with low cost and reliable operation.

And the present invention provides a temperature-compensating signal processor which is capable of being used with a variety of two-wire inductive linear displacement transducers.

The present invention also provides a system for measuring the linear displacement of an object, wherein the system comprises an inductive linear displacement transducer and means coupled to the transducer for providing a signal representative of linear displacement that is compensated for changes in transducer temperature.

What is claimed is:

1. A temperature-compensated transducer system for measuring the linear displacement of an object, said system comprising:
    an inductive linear displacement transducer and temperature-compensating signal processing means coupled to said transducer;
    said transducer comprising a helical electrically-conducting coil wound around a support, and an elongated member of electrically conductive, non-ferromagnetic material matingly receiving in telescoping relation with said coil and said support, said member or said coil being attached to an object whose linear displacement is to be measured, whereby linear displacement of said object will result in linear displacement of said member relative to said coil; and
    said temperature-compensating signal processing means comprising:
        (a) means including current regulator means for connecting said coil to a source of DC potential so as to provide a current through said coil;
        (b) driver means connected to said current regulator means for AC modulating the current through said coil, said driver having an input control terminal and being adapted so that the amplitude of the current through said coil varies in response to a DC signal applied to said input control terminal;
        (c) temperature-sensitive means connected in series between said coil and said current regulator means; and
        (d) signal processing means coupled to said temperature-sensitive means and said driver means for providing a temperature-corrected output signal representative of the linear displacement of said member relative to said coil, said signal processing means including:
    means connected between said temperature-sensitive means and said current regulator means for detecting changes in the DC offset of the signal coming from the coil through said temperature-sensitive means and for generating a signal as the input control signal to said driver means, whereby the output of said driver means will adjust the amplitude of the modulation of the current provided by said current regulator means so as to compensate for any change in the amplitude of the signal coming from the coil due to changes in transducer temperature,
    said signal processing means also including means for monitoring the amplitude of the AC component of the signal coming from the coil and producing an output signal as a function of said AC component which is representative of the position of said member relative to said coil.

2. A system according to claim 1 wherein said temperature-sensitive means is a diode.

3. A system according to claim 1 wherein said temperature-sensitive means is a Schottky diode.

4. A system according to claim 1 wherein said diode is mounted in proximity to said coil.

5. A system according to claim 1 wherein said coil is mounted around a hollow support, and said diode is mounted to one end of said hollow support.

6. A system according to claim 1 wherein said signal processing means comprises:
    means for deriving a first DC signal that varies in accordance with a signal derived from said transducer,
    means connected to said driver means for deriving a second DC signal that varies as a function of the output of said driver means, and
    summing means for summing said first and second DC signals and providing a summed DC signal that varies as a function of the position of said member relative to said coil.

7. A system according to claim 6 comprising a summing amplifier for providing an output that varies as a function of the change in member position relative to coil position, and means for varying the magnitude of the signal output of said summing amplifier.

8. A system according to claim 1 wherein said temperature-sensitive means is a diode, and said signal processing means comprises means coupled to said diode for deriving a DC signal that varies as a function of the thermal response of said diode.

9. A system according to claim 1 wherein said temperature-sensitive means is a diode, and said signal processing means comprises a high pass filter coupled to said diode for passing only AC signals, and further including means coupled to said filter for deriving a DC signal in response to said AC signals that varies as a function of the position of said member relative to said coil.

10. A system according to claim 9 further including means comprising a low pass filter coupled to said diode for producing a corresponding DC signal that varies as a function of the temperature of said diode, and means for applying said corresponding DC signal to said input control terminal of said driver means.

11. A system according to claim 10 wherein said last-mentioned means comprises a TC balance circuit connected so as to respond to said corresponding DC signal and to provide a control signal to said input control terminal of said driver means.

12. A system according to claim 11 further including a span TC adjust circuit for applying said control signal to said input control terminal of said driver means, said span TC adjust circuit comprising means for varying the magnitude of said control signal.

13. A system according to claim 11 comprising a summing amplifier for providing an output that varies as a function of the change in member position relative to coil position, and further comprising a zero TC adjust circuit for applying said control signal to said summing amplifier, said zero TC adjust circuit comprising means for varying the magnitude of said control signal.

14. In combination with a linear displacement transducer of the type comprising a coil and a member movable relative to said coil, whereby linear displacement of said member relative to said coil will produce a change in the inductance of said coil when said coil is energized by a DC current that varies at a selected AC frequency, temperature-compensating means for modifying an output voltage signal derived from said varying DC current flowing in said coil in accordance with changes in the temperature of said coil, said temperature-compensating means comprising:
(a) a temperature-sensitive diode connected in series with said coil, said diode being located in proximity to said coil so that said diode and coil are subjected to the same temperature conditions;
(b) first means for sensing the voltage at one terminal of said diode as said diode and coil are affected by changes in temperature;
(c) second means responsive to said first mean s for producing a first DC signal proportional to the DC voltage sensed by said first means;
(d) third means for sensing the voltage at said one terminal of said diode as said diode and coil are affected by changes in temperature;
(e) fourth means responsive to said third means for producing a second DC signal proportional to the AC component of the current in said coil;
(f) means coupled to said coil for varying the amplitude of said AC component of the current in said coil in response to said first DC signal; and
(g) means coupled to said fourth means for producing an output signal in response to said second DC signal that varies in accordance with displacement of said member relative to said coil regardless of changes in temperature.

15. Apparatus according to claim 13 further including adjustment means for varying the magnitude of said output signal.

16. A temperature-compensated transducer system for measuring the linear displacement of an object, said system comprising:
an inductive linear displacement transducer and temperature-compensating signal processing means coupled to said transducer;
said transducer comprising a helical electrically-conducting coil wound around a support, and an elongated member of electrically conductive, non-ferromagnetic material matingly received in telescoping relation with said coil and said support, said member or said coil being attached to an object whose linear displacement is to be measured, whereby linear displacement of said object will result in linear displacement of said member relative to said coil; and
said temperature-compensating signal processing means comprising:
(a) means including current regulator means for connecting said coil to a source of DC potential so as to provide a current through said coil;
(b) means for AC modulating the current output of said current regulator means;
(c) temperature-sensitive means connected in series between said coil and said current regulator means; and
(d) signal processing means coupled to said temperature-sensitive means for providing a temperature-corrected output signal representative of linear displacement of said member relative to said coil, said signal processing means including means for monitoring the amplitude of the AC component of the signal coming from said coil and producing a DC output signal as a function of said AC component which is representative of the position of said core relative to said coil.

17. A system according to claim 16 wherein said temperature-sensitive means is a diode.

18. A system according to claim 17 wherein said diode is a Schottky diode.

19. In combination with a linear displacement transducer of the type comprising a coil and a member movable relative to said coil, whereby linear displacement of said member relative to said coil will produce a change in the inductance of said coil when said coil is energized by a DC current that varies at a selected AC frequency, temperature-compensating means for modifying an output voltage signal derived from said varying DC current flowing in said coil in accordance with changes in the temperature of said coil, said temperature-compensating means comprising:
(a) a temperature-sensitive diode connected in series with said coil, said diode being located in proximity to said coil so that said diode and coil are subjected to the same temperature conditions;
(b) first means for sensing the voltage at one terminal of said diode as said diode and coil are affected by changes in temperature;
(c) second means responsive to said first means for producing a first DC signal proportional to the DC voltage sensed by said first means;

(d) third means for sensing the voltage at said one terminal of said diode as said diode and coil are affected by changes in temperature;
(e) fourth means responsive to said third means for producing a second DC signal proportional to the AC component of the current in said coil; and
(f) fifth means coupled to said second means and to said fourth means for producing a temperature-compensated output signal in response to both said first and said second DC signals that varies in accordance with and as a function of the displacement of said member relative to said coil.

20. Apparatus according to claim 19 wherein said fifth means comprises a microprocessor and means for storing a look-up table.

* * * * *

UNITED STATES PATENT AND TRADEMARK OFFICE
CERTIFICATE OF CORRECTION

PATENT NO. : 5,115,193

DATED : May 19, 1992

INVENTOR(S) : Orville E. Bean et al

It is certified that error appears in the above-identified patent and that said Letters Patent is hereby corrected as shown below:

Claim 1, column 11, line 64, "receiving" should be -- received --; and

Claim 14, column 13, line 55, "mean s" should be -- means --.

Signed and Sealed this

Seventeenth Day of August, 1993

Attest:

BRUCE LEHMAN

Attesting Officer     Commissioner of Patents and Trademarks